Jan. 3, 1933.  A. GODEL  1,893,363
ACTIVATION OF CARBONACEOUS SUBSTANCES
Filed Aug. 3, 1929  2 Sheets-Sheet 1
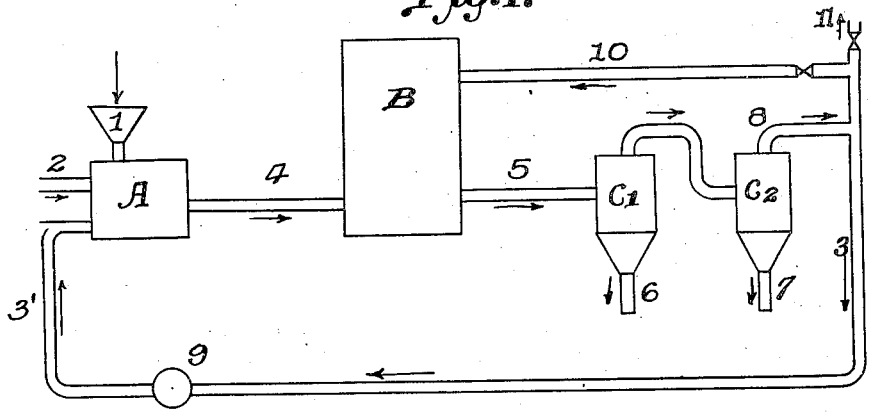
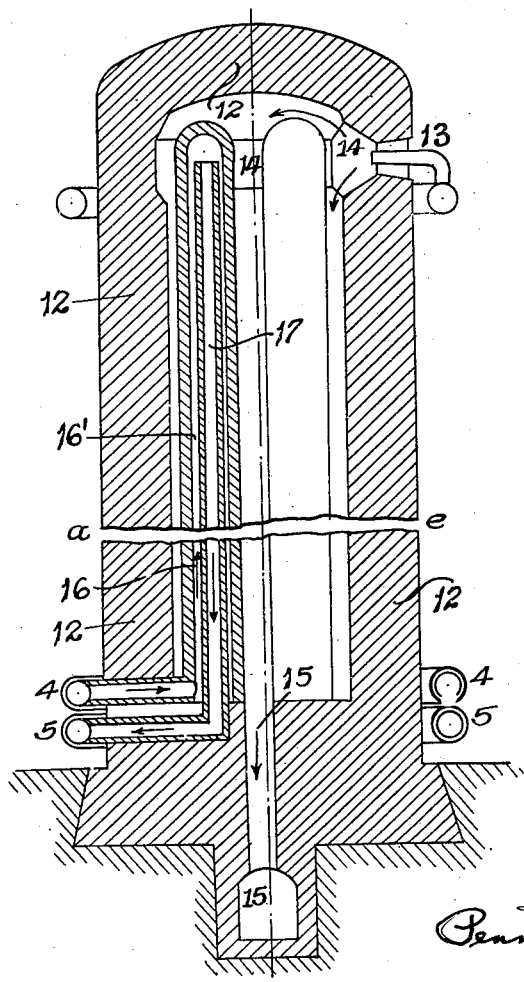
Inventor:
A. Godel;
By
Pennie Davis, Marvin Edmonds
His Attorneys Jan. 3, 1933.   A. GODEL   1,893,363
ACTIVATION OF CARBONACEOUS SUBSTANCES
Filed Aug. 3, 1929   2 Sheets-Sheet 2
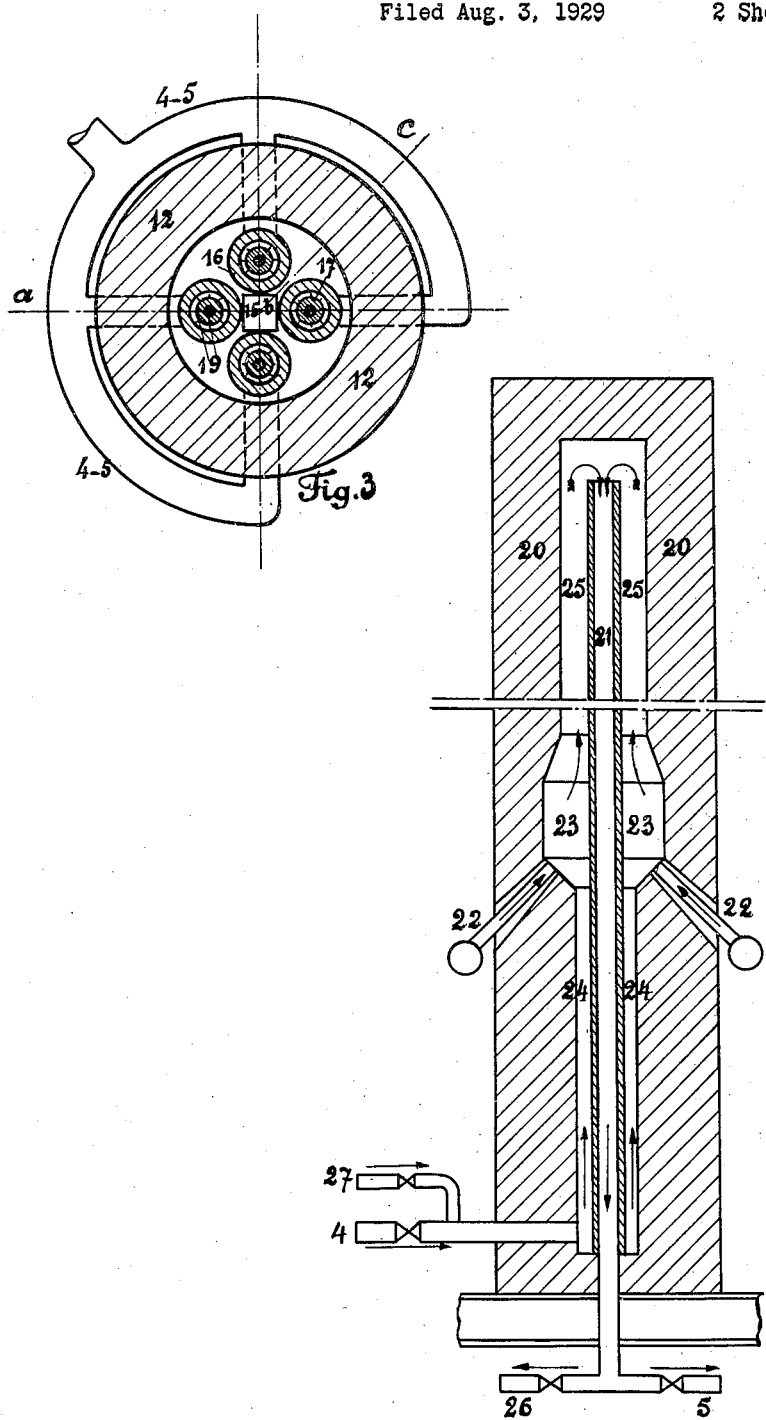

Patented Jan. 3, 1933

1,893,363

UNITED STATES PATENT OFFICE

ALBERT GODEL, OF PARIS, FRANCE, ASSIGNOR TO SOCIÉTÉ DE RECHERCHES &
D'EXPLOITATIONS PETROLIFERES, OF PARIS, FRANCE

ACTIVATION OF CARBONACEOUS SUBSTANCES

Application filed August 3, 1929, Serial No. 383,392, and in France August 9, 1928.

This invention relates to the activation of carbonaceous materials suspended in gases.

It is known that active carbon can be obtained by submitting carbonaceous materials at high temperature to the action of certain "activating" gases, such as water vapour, carbonic acid gas, chlorine, oxygen, etc., employed alone or in mixture. The operation must be conducted in well defined conditions which constitute the very essence of the different inventions which have been made on the subject.

The activation by gases can only take place if the carbonaceous substances are sufficiently permeable to allow the gases to penetrate into the interior of the particles. It will be understood then that the treatment is easier and quicker in proportion as these substances are more finely divided and that for fine powders for example the penetration of the activating gases may be instantaneous.

These conditions of treatment are realized in a certain number of processes allowing, by a particular arrangement of the apparatus, of carrying out the activation of particles suspended in the activating gases.

It is moreover known that in grates or furnaces having a reducing flame, and heated by certain pulverized fuels, there are sometimes found residues of pulverized carbon which present a high activity.

Among the principal drawbacks of the processes mentioned above, are the lack of method in the heating means which it has been possible to apply hitherto, and the great waste of heat resulting therefrom.

Now it is of capital interest to be able to reduce to the minimum the heating expenses which in general form a very heavy charge upon the manufacture of active carbon.

The present invention relates to a process allowing of effecting a maximum economy of heat in the activation of carbonaceous materials suspended in gases.

For this purpose activation retorts with external, internal or mixed heating are arranged in such a way as to carry out a methodical counter-flow circulation of the activating gases charged with carbonaceous materials in suspension and of the "activation gases" by which I means gases evolved during activation.

In these new or improved arrangements for carrying out this process, the active carbon and the "activation gases" resulting from the activation emerge relatively cold from the activation retorts, due to a methodical circulation of the fluids. Further, in the course of the activation, it is possible to obtain combustible gases adapted to serve for the heating of the ovens or retorts.

The activation retorts may be of several types, according as the method of heating adopted is completely external, completely internal or else mixed (both internal and external). With internal heating, the heating or combustion gases and the mixture of activating gases and carbonaceous materials pursue in part the same path inside the retorts; the operation may be continuous or discontinuous, according as the heating and the activation are carried out simultaneously or alternatively.

In arrangements where the gases resulting from the activation reactions are combustible and are not diluted with the heating or combustion gases they can be utilized for the heating of the activation retorts or ovens themselves.

Various means of carrying out the invention are described hereafter by way of example, but it is naturally possible to contrive other devices based upon the same principles and lying within the scope of the invention.

In all the cases contemplated, the activation retorts are preceded by mixing apparatus suitable for bringing carbonaceous materials into suspension in the activating gases; further, following after the said retorts, there are provided separating apparatus for separating the active carbon formed from the activation gases.

According to my observations, it is advantageous to bring the carbonaceous materials into suspension in activating gases diluted with a fairly high proportion of neutral gases or gases having no activating action. The activating gases utilized are for example; water vapour, carbon dioxide, combustion gases, chlorine, etc., and the gases suitable for dilution are, among others, nitrogen, hydrogen, carbon monoxide, activation gases derived in accordance with the invention from previous reactions, water gas, etc. These dilution gases are added to one or more of the activating gases, a mixture of this kind having for effect to realize at the activation temperature a selective oxidation of the inactive parts of the carbonaceous materials, while conserving or maintaining the active carbon already formed.

Upon the accompanying drawings to which reference is made hereafter, the same reference characters designate the same elements.

Figure 1 shows diagrammatically a complete installation for the activation of carbonaceous materials suspended in gases by means of an oven or a retort arranged in accordance with the invention, the oven and the retort being represented respectively in Figures 2 and 3 and in Figure 4.

The installation comprises a dosing mixer A for bringing the carbonaceous materials into suspension in the gases, an oven or retorts B for the activation and the separating apparatus $C_1$ $C_2$.

The carbonaceous materials, granulated, broken up or pulverized in the desired sizes, penetrate through a funnel-shaped passage 1 into the dosing mixer A which on the other hand receives activating gases through the pipe 2 and neutral or substantially neutral gases through the pipe 3, which arrangement allows the bringing into suspension of the said carbonaceous materials in a suitable volume of activating gases of known composition.

The mixture is led as indicated by the arrows, from the dosing mixer A to the activation retorts B through a pipe 4 and from the retorts B to the separators $C_1$ $C_2$ by a pipe 5. These separators may be constituted for example by centrifugal apparatus followed or not by apparatus for filtration or for liquid or electrostatic purification. The active carbon separated out is collected at 6 and 7, while the purified activation gases leave by the pipe 8 and they can be utilized afresh for the bringing into suspension of carbonaceous materials; for this purpose a portion of these gases, following a closed circuit, returns towards the dosing mixer A through the pipe 3' in which there is placed a fan 9 or any other apparatus for maintaining the circulation. The gases in excess, according as they are combustible or not, are led to the oven or retorts by a pipe 10 in order to serve for heating, or rejected to the chimney by a pipe 11.

Figures 2 and 3 show an activation oven or furnace for the external heating of retorts in which a methodical circulation of the gases is carried out.

Figure 2 is a section along the line $a\ b\ c$ of Figure 3.

Figure 3 is a section along the line $d\ e$ of Figure 2.

The vertical oven 12, carefully heat insulated, allows the external heating of a certain number of activation retorts, four in the case considered. This heating can be carried out by the aid of activation gases, producer gas, mazout, crude oil, pulverized coal, etc., supplied to burners 13 which are fed in any suitable manner and spaced around the periphery of a combustion chamber 14 situated at the upper part of the oven, the combustion gases escaping at the lower part through a flue 15.

Each retort is composed of a vertical outer tube 16 closed at the upper end and of a concentric inner tube 17. The mixture of activating gases and carbonaceous materials leaving the dosing mixer A, Figure 1, arrives at the base of the retorts through the pipe 4 into the annular space 16' provided between the tubes 16 and 17, rises in this space as far as the upper part of the said retorts situated in the combustion chamber 14 where there exists a temperature at which the activation is produced very rapidly; then the activation gases and the active carbon formed escape towards the separators $C_1$ $C_2$ through the inner tube 17 and the pipe 5, as indicated by the arrows in Figure 2.

During its upward movement in the annular space 16', the mixture of activating gases and carbonaceous materials in suspension circulates in the opposite direction to the heating gases descending outside the retorts, on the one hand, and to the mixture of activation gases and active carbon formed, descending in the tube 17, on the other hand. The mixture of activating gases and carbonaceous materials is thus heated under the double influence of the heating gases, which allows a perfect utilization of the sensible heat of the said gases and of the mixture of activation gases and active carbon, which allows the recuperation of the heat carried off by the said mixture.

In order to improve the transmission of heat from the combustion gases, baffles may be arranged in the interior of the furnace, which baffles compel the gases to follow a more effective circulation around the retorts. The tubes 16 and 17 may be made of cast iron or of steel in the lower zone of the furnace and of refractory material in the upper zone; the tube 17 will with advantage be provided with inner and outer ribs 19, as represented in Figure 3.

The external heating of the retorts might equally well be carried out by the aid of a suitable electrical apparatus, the combustible gases resulting from the activation being then available for other purposes.

Figure 4 shows in vertical section an activating retort in which there is carried out, in accordance with the present invention, a methodical circulation of the fluids, with an internal heating according to a continuous or discontinuous mode of operation.

The retort is composed of a vertical thick-walled body 20 of cylindrical shape, carefully heat insulated, and made of refractory material with a concentric inner tube 21. The heating can be effected by means of activation gases derived from other retorts, producer gas, mazout, crude oil, pulverized coal etc., reaching the burners 22 spaced around the periphery of a combustion chamber 23 formed in the thickness of the wall 20, or by burning a part of the carbonaceous materials to be activated, by the introduction of a small quantity of air for combustion into orifices arranged in the same manner as the burners 22.

In the case of a continuous operation, the gas or combustible material is admitted to the burners 22 simultaneously with the admission of the mixture of activating gases and carbonaceous materials at the base of the retort into the annular space 24. This mixture is supplied from the dosing mixer A, Fig. 1, through the pipe 4, and it rises in the annular space 24, while absorbing by methodical recuperation the heat carried off by the hot gases which descend in the inner tube 21; then it penetrates into the combustion chamber 23 where by mixture with the combustion gases it is raised to the temperature at which activation is produced very rapidly. The activation is completed during the passage through the upper annular space 25 and the activation gases charged with the active carbon formed escape through the tube 21 while giving up their heat; after which they are directed by the tube 5 towards the separators $C_1$ $C_2$ as indicated by the arrows. In the case here considered, the combustible gases resulting from the activation are too far diluted by the burnt gases to be able to serve for combustion.

In the case of a discontinuous operation, there is a succession of heating and activation periods. In the first place, highly heated gases produced in the combustion chamber 23, rise in the upper annular spaces 25, while giving up their heat to the walls of the body 20, which are thereby raised to a high temperature; these gases then escape by the tube 21 and are discharged by a pipe 26 towards the chimney. It is advantageous to heat the air for combustion by introducing it into the annular space 24 at the base of the retort through an auxiliary passage 27 delivering for example into the pipe 4. This air becomes heated at the expense of the heat units carried off by the combustion gases descending in the tube 21, which allows a perfect utilization of the sensible heat of the said combustion gases.

When the temperature of the walls has become sufficient, the heating is stopped and a change is made to the activation phase. The mixture of activating gases and carbonaceous materials derived from the dosing mixer A, Figure 1, enters through the pipe 4, rises in the annular space 24 while absorbing by methodical recuperation the heat contained in the hot gases descending through the inner tube 21, passes through the chamber 23 and enters through the upper annular space 25 of which the walls are at a high temperature. The activation reactions are effected rapidly and the mixture of activation gases and active carbon formed escapes through the tube 21, where it gives up its heat to the mixture rising in the annular space 24, after which it is directed by the pipe 5 towards the separators $C_1$ $C_2$. In the case last considered, the combustible gases resulting from the activation can be employed for combustion in another retort, for example.

When the temperature of the walls is sufficiently lowered, the supply of gases charged with carbonaceous materials is stopped in order to resume the heating. The fall of temperature allowed may moreover be very small and the periods of heating very close together.

In order to provide a device with simultaneous internal and external heating, in accordance with the invention, there can be combined for example a number of continuous operation retorts of the type described with reference to Figure 4 and provided with suitable outer walls, inside a furnace chamber or oven such as that represented in Figures 2 and 3. Such retorts may moreover be provided with a supplementary external heating, for example electrical heating.

Without departing from the scope of the invention, it is possible to construct retorts of any vertical or transverse section, to arrange the retorts obliquely or horizontally, to circulate the gases in opposite directions in the annular spaces and in the central tube, to connect together several retorts in such a way as to allow a continuous passage in the interior of the said retorts of the heating gases and of the mixture of activating gases and carbonaceous materials in suspension, with a view to carrying out the treatment in several phases.

What I claim is:—

1. An activation process, characterized by the feature that the carbonaceous materials are suspended in activating gases circulated methodically in counter-current to the gases resulting from the activation reaction and having the active carbon formed suspended therein, and that the activating gases are preheated by said resulting gases.

2. An activation process, characterized by the feature that the carbonaceous materials are suspended in activating gases diluted with a proportion of nonactivating gases, the mixture being circulated methodically in counter-current to the gases resulting from the activation reaction and having the active carbon formed suspended therein, and that the mixture is pre-heated by said resulting gases.

3. An activation process, characterized by the feature that the carbonaceous materials are suspended in activating gases diluted with gases resulting from activation reactions, the mixture being circulated methodically in counter-current to the gases resulting from the activation reaction and having the active carbon formed suspended therein, and that the mixture is pre-heated by said resulting gases.

4. An activation process, characterized by the feature that the carbonaceous materials are suspended in activating gases circulated in a continuous and methodical manner through passages communicating with a heated retort, while the activation gases resulting from the reaction and having the active carbon formed suspended therein circulate through other passages separate from said first mentioned passages but so arranged as to facilitate the transfer of heat from the activation gases to the activating gases.

5. A process for the activation of carbonaceous materials suspended in gases, comprising the circulation of said gases into a heated zone, and the discharge of the residual gases after activation of said carbonaceous materials, said residual gases travelling in counter-current flow to said first mentioned gases whereby to facilitate the transfer of heat from the residual gases to the first mentioned gases.

6. A process for the activation of carbonaceous materials suspended in gases, comprising the circulation of said gases into a retort heated by the circulation of heating gases outside said retort, and the discharge of the residual gases having the active carbon formed suspended therein, said residual gases travelling in counter-current flow to said activating gases inside said retort and giving up sensible heat to said activating gases.

7. Apparatus for the activation of carbonaceous material, comprising a heated retort composed of a vertical outer tube closed at its upper end and of a concentric inner tube open at both ends, means for circulating a current of activating gases having carbonaceous material in suspension therein up the annular space around said inner tube, and means for discharging the resulting gases and active carbon formed so as to pass down said inner tube in counter-flow to said current of activating gases circulating up said annular space.

8. Apparatus for the activation of carbonaceous material suspended in gases, comprising an activation retort composed of a vertical outer tube closed at its upper end and of a concentric inner tube open at both ends, an oven in which said retort is enclosed for heating by a downward current of hot gases, means for circulating a current of activating gases having carbonaceous material in suspension therein up the annular space around said inner tube, and means for discharging the resulting gases and active carbon formed so as to pass down said inner tube, said current of activating gases circulating in counter flow both to said heating current of hot gases and also to said resulting gases in discharge.

9. An activation process, characterized by the provision of a methodical counter-current circulation of the activating gases containing in suspension the carbonaceous material to be activated and the activation gases containing in suspension the active carbon formed by the reaction, sensible heat being transferred from the activation gases to the activating gases in said counter-current circulation.

10. An activation process according to claim 9, in which the activating gases prior to entering into reaction are diluted with gases derived from activation reactions.

11. An activation process according to claim 9, in which there is provided a partly closed circuit of the said gases derived from activation reactions, said gases being mixed with the activating gases and utilized for the bringing into suspension of the carbonaceous material.

In testimony whereof I have affixed my signature.

ALBERT GODEL.